K. R. VAN WINKLE.
PLOW ATTACHMENT.
APPLICATION FILED APR. 18, 1908.
936,962.
Patented Oct. 12, 1909.
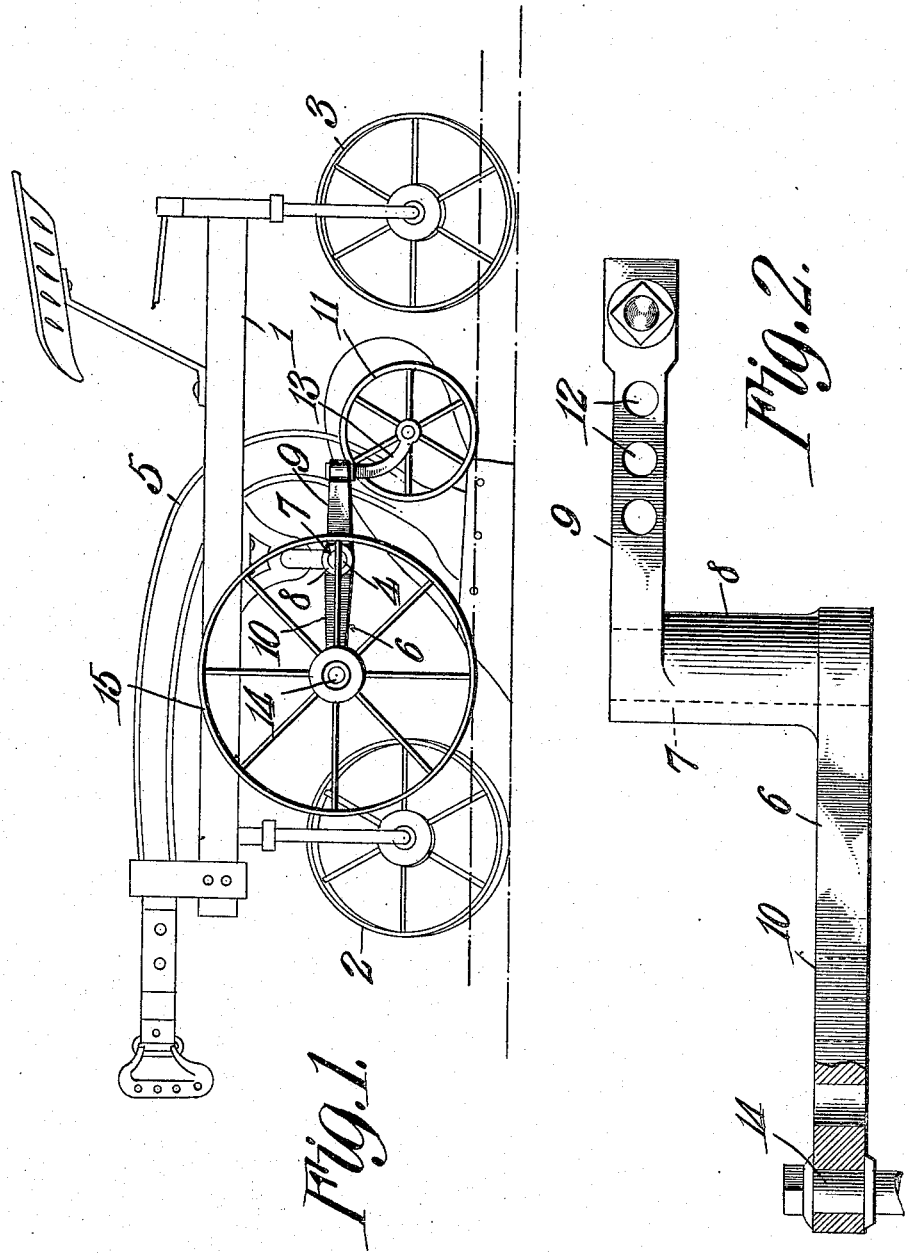
Witnesses
Inventor
Kelly R. VanWinkle.
By
Attorneys

UNITED STATES PATENT OFFICE.

KELLY R. VAN WINKLE, OF HILLSBORO, IOWA.

PLOW ATTACHMENT.

936,962.     Specification of Letters Patent.     Patented Oct. 12, 1909.

Application filed April 18, 1908. Serial No. 427,889.

*To all whom it may concern:*

Be it known that I, KELLY R. VAN WINKLE, a citizen of the United States, residing at Hillsboro, in the county of Henry and State of Iowa, have invented a new and useful Plow Attachment, of which the following is a specification.

This invention has relation to plow attachments and it consists in the novel construction and arrangement of its parts as hereinafter shown and described.

The object of the invention is to provide an attachment especially adapted to be applied to the spindle shank of the sulky plow and which is mounted upon wheels and is adapted to reduce the vertical movement of the plow as it passes over uneven surfaces upon the ground. The said attachment is provided at its forward end with a wheel which is relatively fixed while at its rear end it is provided with a freely castered wheel. The said wheels do not track or occupy the same plane, consequently, should one wheel pass over an uneven surface the other wheel might escape the same and by reason of the fact that the wheels are located in front of and behind the spindle shank of the plow frame instead of being located directly beneath the same any vertical movement at the ends of the attachment is reduced at the middle thereof. Means is provided for adjustably mounting the said wheels upon the attachment.

In the accompanying drawing:—Figure 1 is a side elevation of the sulky plow provided with the attachment, and Fig. 2 is a top plan view partly in section of the arm of the attachment.

As above indicated the attachment is especially adapted to be applied to a sulky plow which consists primarily of the frame 1 supported upon the furrow wheels 2 and 3. The spindle shank or axle 4 is attached to the frame 1 and the plow beam 5 is suitably connected with the said frame.

A land wheel (not shown) is usually journaled upon the spindle shank 4 but I remove such land wheel and in lieu thereof place upon the shank 4 an arm 6, said arm having at an intermediate point a transverse opening 7 for the reception of the spindle shank 4. The arm 6 is pivotally mounted upon the shank 4 and is provided at the ends of its barrel or bearing 8 with the end portions 9 and 10, the portion 10 being somewhat longer than the portion 9 and being forwardly disposed with relation to the plow. The wheel 11 is freely castered at the rear or shorter end portion of the arm 6 and may be adjusted along the end portion which is provided with the perforations 12 adapted to receive the shank of the yoke 13. The spindle 14 is adjustably mounted upon the forward or longer end portion 10 of the arm 6 and the ground wheel 15 is journaled upon the said spindle 14. The wheel 15 is of greater diameter than the wheel 11 and the said wheels do not track with each other as they occupy different vertical planes.

The operation of the attachment is as follows:—As the plow moves along the surface of the ground and the wheels 15 and 11 pass over uneven places the arm 6 is swung pivotally about the spindle 4 and consequently the said spindle is not elevated to such an extent as it would be if a ground wheel were journaled directly thereon and should pass over the same uneven place, therefore as the plow passes along ground having an uneven surface the vertical movement of the share is reduced to a minimum and practical uniformity of depth of cut is maintained. The advantage gained by having the wheels of the attachment occupying distinct planes is that should one wheel pass over an uneven surface the other wheel might escape the same.

Having described my invention, what I claim as new and desire to secure by Letters Patent is:—

In a plow, an axle, a sleeve fitted upon the axle to rock thereon, and arms formed integral with the sleeve, and projecting in opposite directions therefrom in parallel planes, the said arms being offset one with respect to the other, one arm being provided with a plurality of openings extending transversely therethrough, and the other arm with a plurality of openings extending vertically therethrough, a stub axle supported by the first mentioned arm and engageable in the openings thereof interchangeably, the said axle projecting laterally from the arm, a wheel journaled upon the axle, a yoke having a journal received in the openings of the other arm interchangeably, the said yoke extending vertically, and a wheel journaled in the yoke.

In testimony that I claim the foregoing as my own, I have hereto affixed my signature in the presence of two witnesses.

KELLY R. VAN WINKLE.

Witnesses:
 EVA MARTIN,
 GRACE BELL.